United States Patent

Beard

[15] 3,638,627
[45] Feb. 1, 1972

[54] VARIABLE ADVANCE ENGINE IGNITION TIMING CONTROL

[72] Inventor: Garry E. Beard, Livonia, Mich.
[73] Assignee: Ford Motor Company, Dearborn, Mich.
[22] Filed: Mar. 3, 1970
[21] Appl. No.: 16,164

[52] U.S. Cl.............................123/117.1, 92/48, 92/84
[51] Int. Cl.................................F02p 5/10, F01b 19/00
[58] Field of Search .................123/117.1; 92/48, 84, 64, 63

[56] References Cited

UNITED STATES PATENTS

| 2,192,117 | 2/1940 | Wile | 92/48 |
| 2,936,785 | 5/1960 | Hastings | 92/63 |
| 3,065,997 | 11/1962 | Frankhouser | 92/64 |
| 3,370,577 | 2/1968 | Guetersloh | 123/117.1 |
| 3,385,275 | 5/1968 | Burnia | 123/117.1 |
| 3,515,105 | 6/1970 | Soeters | 123/117.1 |
| 3,521,609 | 7/1970 | Kashiwagi | 123/117.1 |

FOREIGN PATENTS OR APPLICATIONS

| 1,148,608 | 4/1969 | Great Britain | 92/64 |

*Primary Examiner*—Mark M. Newman
*Assistant Examiner*—Ronald B. Cox
*Attorney*—John R. Faulkner and Robert E. McCollum

[57] ABSTRACT

A dual diaphragm servo has one diaphragm operatively connected to the engine distributor advance plate and operatively interconnected with the other, the two diaphragms being operatively controlled in their movements by vacuum from induction passage ports at opposite sides of the carburetor throttle valve, the vacuum to the diaphragms being selectively controlled as functions of changes in vehicle speed and for engine or ambient operating temperatures, to modulate the timing advance in a variable manner with changes in vacuum level.

12 Claims, 3 Drawing Figures

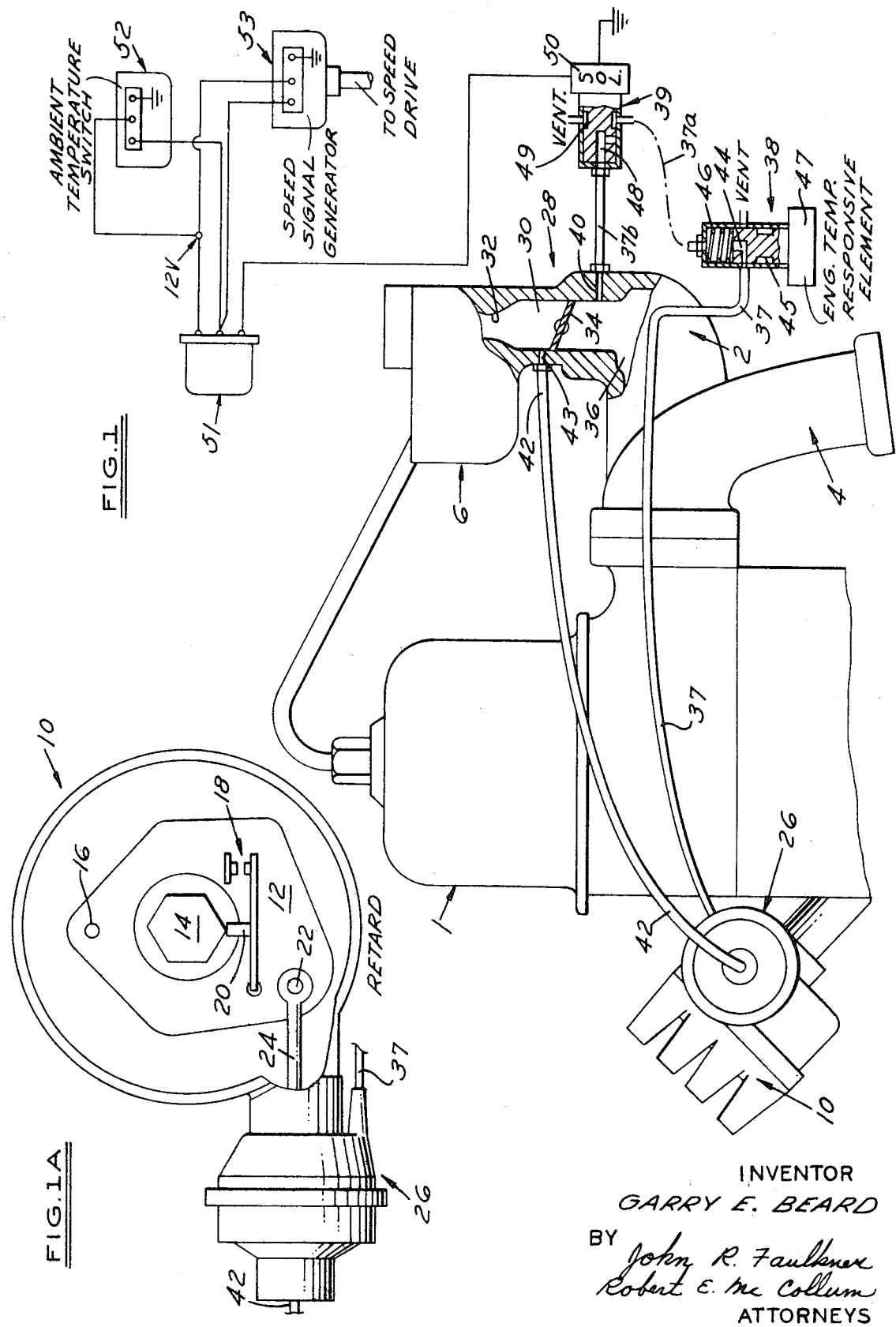

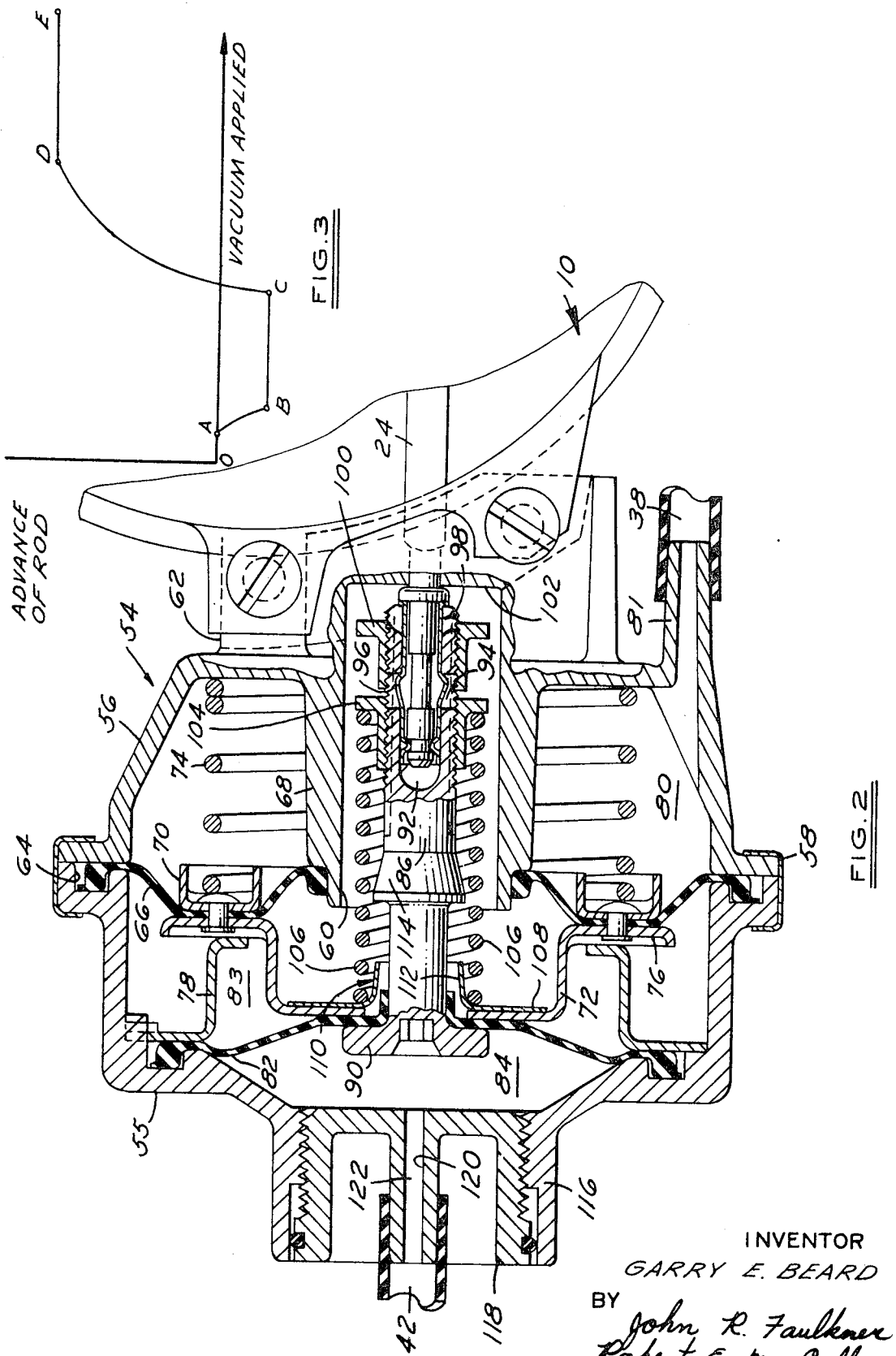

VARIABLE ADVANCE ENGINE IGNITION TIMING CONTROL

This invention relates, in general, to an internal combustion engine, and more particularly, to an apparatus for controlling the spark timing of said engine.

Antismog regulations relating to internal combustion engine exhaust emission controls point out the desirability of a retarded ignition timing at engine idle and low speed operating conditions, advancing the timing during engine decelerating conditions above a predetermined speed, as well as a shift to advance timing at most other engine operating conditions. The retarding of the ignition timing prolongs combustion and reduces engine exhaust hydrocarbon and other undesirable emissions, while the shift to ignition timing advance provides engine performance and economy.

Systems are known in the prior art for automatically pivoting the engine distributor advance plate to advance or retard the spark timing. However, these systems, in general, do not permit the modulating of the timing advance in a desired manner to satisfactorily reduce undesirable emissions, and also, generally require a number of servos to perform all the functions desired, briefly outlined above.

The invention provides an engine spark timing apparatus that accomplishes the above objectives through the use of a single servomechanism connected to the distributor breaker plate. The servo has a number of separate but functionally interrelated vacuum chambers that are operatively connected at selected times to the vacuum in the carburetor induction passage at points above and below the throttle valve to vary engine ignition timing in a selected manner as a function of the changes in vacuum level.

It is a principal object of the invention, therefore, to provide an engine ignition timing assembly that automatically varies the timing as a function of changes in carburetor throttle valve position, and engine load and speed, in a manner that minimizes the formation in the engine exhaust of undesirable smog producing elements.

It is an additional object of the invention to provide a dual diaphragm vacuum controlled servomechanism for use in the above assembly that operates automatically in conjunction with other controls to properly modulate the movement of the ignition distributor spark advance and retard mechanism to provide the desired retarding or advancing of the spark at all engine operating conditions.

It is a still further object of the invention to provide a vacuum motor assembly consisting of two coaxially mounted flexible diaphragms within a common housing partitioning the housing into separate fluid or vacuum chambers; the chambers being operably and separately connected at times to portions of an engine carburetor above and below the throttle valve, and, one of the diaphragms being connected to the distributor advance plate and being operably connected at times with the other diaphragm to provide a controlled modulated movement of the spark advance plate.

Other objects, features and advantages of the invention will become more apparent upon reference to the succeeding detailed description thereof, and to the drawings illustrating the preferred embodiment thereof, wherein;

FIG. 1 illustrates, schematically, an internal combustion engine spark timing control assembly embodying the invention;

FIG. 1a shows an enlarged view of the servomechanism in FIG. 1, with parts broken away;

FIG. 2 is an enlarged cross-sectional view of the vacuum motor assembly illustrated in FIG. 1a; and FIG. 3 graphically illustrates the movement of parts of the invention with changes in vacuum level.

FIGS. 1 and 1a show, schematically, portions of an internal combustion engine that generally are interrelated to provide for an automatic retardation or advancement of the engine distributor ignition timing. More specifically, the engine 1 is shown as being of the overhead valve type having the usual intake and exhaust manifold 2 and 4 and a carburetor 6. 10 indicates, in general, an ignition distributor of the centrifugal advance type.

As best seen in FIG. 1a, the distributor has an ignition timing advance late 12 that surrounds a conventional rotor cam 14. The plate is pivoted for movement about a point 16 fixed to the stationary distributor housing at a point not shown. Rotor cam 14 cooperates with a set of breaker points 18 by means of an actuator 20 secured to one arm of the breaker points set, as shown. Advance plate 12 is pivotally secured at 22 to a reciprocable actuating rod or link 24 that is adapted to be moved in a manner to be described by a dual diaphragm vacuum motor assembly 26.

FIG. 1 shows a cross-sectional portion 28 of the internal parts of a carburetor of the conventional downdraft type. It has the usual air-fuel induction passage 30 containing a fixed area venturi 32 and a conventional rotary throttle or butterfly valve 34. The latter is pivotally mounted on the sides of the carburetor body to control flow from passage 30 to the engine intake manifold passage indicated at 36.

Other details of construction and operation of the carburetor and distributor per se are not given since they are known, are conventional, and are believed to be unnecessary for an understanding of the invention.

In general, vacuum motor assembly 26 includes two flexible diaphragms, each of which forms a fluid or vacuum chamber with the housing to provide various control movements of the advance plate actuating rod 24. An atmospheric or ambient pressure chamber separates the two vacuum chambers. The vacuum chamber closest to distributor 10 is connected by a hose or line 37 through two valves 38 and 39 to the vacuum of the engine intake manifold. The connection is made through a carburetor port 40 that opens into the carburetor passage below throttle valve 34. It will be clear, of course, that port 40 could be located to open directly into intake manifold 36.

The other vacuum motor chamber of servo 26 normally is connected by a hose or line 42 directly to a sparkport 43. The latter is located at a point in carburetor induction passage 30 just above throttle valve 34 when it is in its idle speed or essentially closed throttle position.

The two valves 38 and 39, which in this case are similarly constructed, automatically control the application of intake manifold vacuum or atmospheric pressure to the servo 26 as a function of, in this case, engine temperature changes, vehicle speed, and ambient temperature conditions.

More specifically, valve 38 is a spool valve having a through port 44 and an annulus 45. The valve is biased by a spring 46 to the position shown to connect either vacuum or atmospheric pressure, as the case may be, in line 37a to line 37. The valve includes a temperature responsive element 47 that, in this case, would be located in the water manifold (not shown) of engine 1. The element linearly expands and moves valve 38 upwardly whenever the water temperature exceeds a normal or desired value. This moves valve 38 to connect line 37 through annulus 45 to atmospheric pressure in the vent shown, for a purpose to be described later.

Valve 39 is also a spool valve type, having a through port 48 and an annulus 49. The valve is spring biased to the position shown, and is fixed (not shown) to the armature of a solenoid 50 indicated schematically, as shown.

The solenoid is connected to a battery or similar 12 volt power source indicated through a relay-amplifier 51, a speed sensor element 52, and a switch 53. The amplifier in this case is of the flip-flop or reversing type. That is, an input signal to the relay causes it to provide no output; no input provides an output.

Further details of construction of the solenoid, relay and switches are not given since they can be conventional, are known, and are believed to be unnecessary for an understanding of the invention.

The two switches 52 and 53 are connected in parallel between the battery and relay 51 so as to independently control the energization of solenoid 50. Sensor 52 in this case is a vehicle speed signal generator. Below a vehicle speed of, say 28 miles per hour, for example, the generator does not develop a sufficient voltage output to provide an input to relay 51. Therefore, below 28 m.p.h., the reversing relay 51 provides an output energizing the solenoid 50 and moving valve 39 from the position shown to connect port 48 to line 37a. When deenergized, the valve 39 returns to the position shown, connecting line 37a to atmospheric pressure.

Switch 53, on the other hand, is an ambient temperature responsive switch that can be set to close below any temperature desired, to maintain the solenoid 50 deenergize at all times. This would provide normal advance without modulation, if desired. Switch 53 is set to open, in this case, for example, above 60° F. ambient temperature conditions to cut off the input to relay 51 and to thereby cause the relay 51 to energize the solenoid 50, if not already energized by operation of the speed generator below 28 m.p.h., to apply vacuum to line 37a. This will retard the advance and prolong combustion and thereby reduce the undesirable emission output.

FIG. 2, which is essentially to scale, shows the details of construction of vacuum motor assembly 26. More specifically, the vacuum motor has an outer housing 54 that includes a bell-like, hollow, left hand portion 55, and a donut-shaped, right hand portion 56. The two portions are held together by a clamp ring 58. Portion 56 has a central opening 60, and also a pair of mounting tabs 62 that align with tabs on the housing of distributor 10 to support the servo assembly.

The outer edge of portion 54 has an annular groove 64 in which is sealingly mounted the outer edge of an annular flexible spark retard diaphragm 66. The diaphragm has a washer-like configuration, with its inner edge suitably secured, as by gluing, for example, to a shouldered portion of a sleeve 68 defining opening 60.

The central portion of diaphragm 66 has riveted to it, in back-to-back manner, a cup shaped spring retainer 70 and a hat-shaped washer 72.

A lightly preloaded spark retard spring 74 normally biases diaphragm 66 to the position shown locating the outer flange edge 76 of washer 72 against the edge of an annular stop 78. The stop is fixed to housing portion 55 and limits the movement of retard diaphragm 66 in the spark timing advance direction. The location of the stop determines the point at which the diaphragm 66 in effect "takes off" in a spark retard direction towards the right when vacuum and spring forces are past the balance point. This will be explained more fully later. The diaphragm 66, together with the walls of housing portion 56, defines a fluid or vacuum chamber 80. Chamber 80 is connected to intake manifold vacuum hose 38 (FIG. 1), by means of an adapter 81.

A second flexible annular diaphragm 82 has its outer edge sealingly mounted between housing portion 54 and stop plate 78, and extends across the housing to define with it a second fluid or vacuum chamber 84. Chamber 84, as best seen in FIG. 1, is connected to hose 42.

Distributor advance plate actuating lever or rod 24 is secured to advance diaphragm 82 by means of an adjustable screw device or linkage 86 so that movement of the diaphragm 82 in either direction will cause a corresponding pivotal movement of the distributor advance plate 12 (FIG. 1). The radially inner edge 88 of diaphragm 82 is sealingly glued or otherwise secured to the head portion 90 of movable screw rod 86. The latter has an elongated rodlike body extending freely axially through housing sleeve 68. At its rightward end, rod 86 has a recess 92 formed with a number of slots 94. The latter yieldingly receive a detent 96 formed on a hollow springlike rod retainer 98 that is flexibly secured to the end of actuating rod 24 to connect the rod to screw rod 86.

Threadedly mounted on the outside of rod 86, for adjustment purposes, is a sleeve like stop member 100. This member limits the movement of rod 86 in a rightward or spark retard direction upon abutment against portion 102 of the servo housing. Thus, the maximum spark timing retard position of rod 24 is determined by the adjusted position of stop 100 on rod 86. One way of modulation of the ignition timing, therefore, is obtained by adjustment of the stop position.

A second sleeve like member 104 is threadedly mounted on rod 86, and serves as the seat for one end of what will be called the primary or advance spring 106. Adjustment of the position of sleeve 104, of course, will vary the preload on spring 106. The opposite end of the spring seats against the flange portion 108 of the sleeve 110 abutting the washer or link 72. The upper edge of hub portion 112 of sleeve 110 is adapted to lie in the path of movement of and cooperate with a conical raised section 114 formed on rod 86. This restricts movement of rod 86 and primary diaphragm 82 away from diaphragm 66.

Substitution of sleeves similar to sleeve 110 but having axially longer or shorter hub portions 112 will, of course, vary the axial distance between the end of portion 112 and the conical portion 114 and provide different operating characteristics to the ignition timing.

To complete the construction, housing portion 55 has a cylindrical projection 116 that threadedly receives a recessed plug 118. The latter is axially adjustable and constitutes a movable stop for the end 90 of screw rod 86. The plug also has a central nipple 120 with an internal passage 122 connected to chamber 84. As shown, hose 42 slips over the end of nipple 120.

Before proceeding to the operation, it should be noted that the advance and retard springs 106 and 74 are in parallel. Therefore, the spring rate and/or preload force of secondary chamber spring 74 can be very light, and need be just enough to position the secondary link member 72 against the rear face of screw head 90, as shown.

It also should be noted that the action of the advance spring 106 is controlled solely by the advance force in chamber 84 except for the stop actions; i.e., from whatever position the link 72 assumes, the rod 86 assumes an aspect relative to it depending only on the advance vacuum force and the stops. The action of the retard spring 74 is controlled by the differential of the retard vacuum force in chamber 80 over the advance vacuum force in chamber 84 and the stop actions. It will be evident that the retard diaphragm 66 should have a larger area than that of the advance diaphragm 82 if equal vacuums are to be used in both chambers. Furthermore, the rod 86 and advance spring 106 is piggybacked onto the link 72, and, therefore, the movement of the link serves as a modulator of the advancing action of the rod relative to the link.

FIGS. 1, 1a and 2 illustrate the operation of the system and servo 60 when the internal combustion engine is off, the engine water temperature is within the normal range, the ambient temperature is above 60° F., and the vehicle is at rest. There is no airflow through carburetor passage 30 into the intake manifold, and the pressure level at both ports 40 and 43 is atmospheric. Valve 39 connects hose 37a to atmospheric pressure. Primary and secondary chambers 84 and 80, therefore, are at atmospheric pressure. Thus, atmospheric pressure forces acting on diaphragms 66 and 82 permit secondary diaphragm spring 74 to seat stop washer flange 76 against the stop 78, the primary advance spring 106 seating primary diaphragm 82 as shown with the screw head 90 against stop link 72. Actuating rod 24, therefore, is positioned at this time to provide a retarded spark timing for starting of the engine. This is illustrated at 0 on FIG. 3.

The position shown in FIGS. 1, 1a and 2 also corresponds to wide open throttle operating conditions above a speed of say 28 m.p.h. The input from the speed sensor 52 conditions the amplifier 51 for not output. Therefore, the solenoid is deenergized and line 37a connected to atmospheric pressure. Throttle valve 34 is rotated essentially wide open and port 46, therefore, also is essentially at atmospheric pressure; therefore, the same pressure conditions exist in the primary and secondary diaphragm chambers 84 and 80 as at engine starting, and actuating rod 24 remains in the same spark retard position shown and described.

Assume now that the engine has been started, and throttle pedal 34 is in the closed position shown in FIG. 1, for idle speed operation. Relay 51 receiving no signal from either switch 53 or speed generator 52 provides an output to energize the solenoid 50. Intake manifold vacuum at this time is high and reflected in the hoses 40, 37b, 37a and 37 to secondary diaphragm chamber 80. The manifold vacuum is sufficient at this time to overcome the light preload force of spring 74 and pull diaphragm 66 to the right.

Carburetor spark port 43 being essentially at atmospheric pressure, atmospheric pressure is applied through hose or line 42 to primary diaphragm 82. Assuming that the preload of spring 106 is not overcome, movement of link or stop 72 to the right will, through spring 106, also move screw rod 86 to the right until stopped by abutment of stop 100 against housing portion 102. Thus, actuating rod 24 will have been moved to the maximum retard position.

The latter movement of diaphragm 66 is represented by the curve AB in FIG. 3, the slope of the curve being determined by the spring rate. FIG. 3 is a graphical representation of a typical advance travel movement of rod 86 as a function of the changes in vacuum. Diaphragm 66 may or may not, depending on the vacuum level and the preload of spring 106, continue to the right by compressing spring 106 until link 72 abuts the edge of sleeve 68. Alternatively, of course, if the length of hub 112 of sleeve 110 is longer, then it will bottom against conical stop 114 before the portion 108 abuts the end 60 of sleeve 68, to stop the movement of retard diaphragm 66 and determine the preload on spring 106.

Assume now the engine is accelerated from idle speed to part throttle engine operation. The accelerator pedal is moved off idle position, increasing the vacuum in port 43 and in primary chamber 84. Until the preload of spring 106 is overcome, no advance movement of rod 86 to the left will occur. This is represented by the straight line BC in FIG. 3. Subsequently, when the vacuum increases to a level sufficient to begin moving diaphragm 82, rods 86 and 24 will move to the left in a spark advance direction, progressively further compressing advance spring 106. Diaphragm 66 will remain in the previous position attained. This stage is represented by the curve CD in FIG. 3. Finally, when vacuum has moved screw end 90 against stop plug 118, or, alternatively, conical portion 114 is stopped by the hub 112 of member 110, advance movement of rods 86 and 24 will cease. From this point on, further increases in vacuum in line 42 will produce no further advance. This is represented by the straight line DE in FIG. 3.

During this time, the diaphragm 66 will remain in the rightward position since atmospheric pressure acts in the chamber 83 between the diaphragms, as admitted from the outside through the clearance space between sleeve 68 and rod 86.

Obviously, of course, the travel movement of rods 86 and 24 can be varied from the paths represented by the curves in FIG. 3, and the slopes of the curves can be varied, by individually or concurrently varying the spring rates of the advance and retard springs 106 and 74; varying the initial preload on the springs; varying the positions of the stop members 100, 118 and spring seat 104; or varying the dimensions of the stop 78 and sleeve 110.

Until the speed of the vehicle exceeds 28 m.p.h., or the ambient temperature drops below 60° F., or the engine operating temperature, as indicated by the water temperature, exceeds the normal, conditions will remain as described.

Assume now that the ambient temperature drops below 60° F. The air now mixing with the fuel is denser and thereby permits a greater combination by weight with the fuel than previously. It may be desirable at this time to have a greater advance timing to provide more performance. The input signal to the amplifier from the now closed temperature switch 53 accomplishes the advance by cutting off the output to the solenoid and positioning the valve 39 as shown. Atmospheric pressure is communicated to lines 37a. and 37 and secondary chamber 80. This relieves the previous vacuum force acting in chamber 80 on advance diaphragm 82 and unless screw head 90 is against stop 118, permits a further advance movement of diaphragm 82 for the same vacuum level in spark port 43. This condition will remain so long as the ambient temperature remains below the selected level of 60° F.

Alternatively, assume the engine overheats as evidenced by an increase in the water temperature. This causes the temperature responsive element 47 to move valve 38 upwardly. This connects the vent to line 37, and puts atmospheric pressure in chamber 80. The same conditions prevail, therefore, as previously described in connection with the ambient temperature drop. The timing is advanced more than normal. This speeds up the engine and causes a greater water circulation, which eventually will cool the engine to its normal operating temperature.

From the foregoing, it will be seen that the invention provides a single servo that automatically operates to schedule the engine ignition timing as a function of the changes in manifold and spark port vacuum, and engine and/or ambient temperature conditions, as well as the speed of the vehicle. It will be clear, of course, that other temperature, and/or pressure, and/or speed controls can be used; and, that the controls can be arranged to control the carburetor spark port vacuum line rather than the manifold line, as described, all within the scope of the invention, to provide other operative characteristics of the ignition timing.

I claim:

1. A spark timing apparatus for an internal combustion engine comprising, an engine throttle valve controlled carburetor air/fuel mixture induction passage having a pair of fluid flow pressure sensing ports located upstream and downstream of the throttle valve when in its idle speed position, a spark timing distributor breaker plate movable in opposite directions to operably advance or retard the engine spark timing, vacuum servo means comprising a housing having first and second axially spaced flexible annular diaphragms therein dividing said housing into first and second vacuum chambers, means connecting said first diaphragm to said breaker plate to move the latter, first and second conduit means connecting said first and second chambers respectively to said carburetor upstream and downstream ports, the increase in upstream port vacuum level during movement of the throttle valve from its idle speed towards full throttle position effecting spark advance timing movement in said one direction of said first diaphragm, the increase in the downstream port vacuum level during movement of the throttle valve towards its closed throttle position urging said second diaphragm in the opposite spark timing retard direction, first spring means biasing said second diaphragm in a spark timing advance direction and towards said first diaphragm, second spring means operatively positioned between said diaphragms in a manner such that movement of either of said diaphragm in a direction away from the other effects a modulating increasing biasing force on the other in the same direction by means of a movement of said second spring means in the same direction, a pair of stop means operatively limiting movement of said second diaphragm in opposite directions, said second diaphragm being operably engaged at times by said first diaphragm to variably limit spark timing retard movement of said first diaphragm as a function of the positions of said second diaphragm as determined by the vacuum level in said upstream and downstream ports, the higher idle speed vacuum level in said downstream port compared to the vacuum level in the upstream port effecting movement of said second diaphragm against one of said stop means and the engagement of said first diaphragm against said second diaphragm to position said breaker plate for maximum spark timing retard, the opening of said throttle valve effecting movement of said first diaphragm in a spark advance direction away from said second diaphragm.

2. A spark timing apparatus as in claim 1, said means connecting said first diaphragm to said breaker plate including seat means for said other spring means, said seat means being variably adjustably movably mounted to adjust the preload on said other spring means and thereby modulate the spark timing movement of said first diaphragm as a function of the position of said seat means.

3. A spark timing apparatus as in claim 1, including other stop means in the path of movement of said first diaphragm in a spark timing advance direction, and means adjustably mounting said other stop means to modulate the spark timing advance as a function of the position of said other stop means.

4. A spark timing apparatus as in claim 1, aid means connecting said breaker plate and said first diaphragm having other stop means adjustably mounted thereon and movable therewith, and stationary means projecting into the path of movement of said other stop means for engagement therebetween at times to limit the spark timing travel movement of said first diaphragm and modulate the spark timing as a function of the adjustment of said other stop means.

5. A spark timing apparatus as in claim 4, said means connecting said breaker plate and first diaphragm comprising linkage means, said other stop means comprising a sleeve member axially movably mounted on said linkage means.

6. A spark timing apparatus as in claim 5, including second sleeve means axially adjustably mounted on said linkage means, said second spring means seating against said second sleeve means whereby the preloading of said second spring means and the spark timing travel of said first diaphragm is modulated as a function of the adjusted position of said second sleeve means.

7. A spark timing apparatus as in claim 1, said means connecting said first diaphragm and said breaker plate including linkage means, and further stop means operatively connected to said second diaphragm and operatively engaged by said first diaphragm upon movement of said first diaphragm relative to said second in both axial directions by a predetermined mount to control the spark timing movement of said first diaphragm.

8. A spark timing apparatus as in claim 7, said further stop means inclu;ing a sleeve surrounding a portion of said linkage means and being abuttable at times by a portion of said linkage means.

9. A spark timing apparatus as in claim 1, including valve means in one of said conduit means movable alternately to vent to atmosphere the chamber associated with said one conduit or to connect said latter chamber to the carburetor port associated with the said one conduit means, and means to move said valve means to vary the spark timing of said engine.

10. A spark timing apparatus as in claim 9, said means for moving said valve means including means operably movable in response to the attainment of a predetermined vehicle speed.

11. A spark timing apparatus as in claim 9, said means for moving said valve means including temperature responsive means movable in response to the attainment of a predetermined ambient temperature for moving said valve to one of said positions.

12. A spark timing apparatus as in claim 9, said means for moving said valve means comprising means responsive to the attainment of a predetermined engine operating temperature for moving said valve means to one of said positions.

* * * * *